(12) United States Patent
Dai et al.

(10) Patent No.: US 9,932,517 B1
(45) Date of Patent: Apr. 3, 2018

(54) POLYMER AND PREPARATION METHOD THEREOF, AND VISCOSIFIED ACID FLUID

(71) Applicants: China University of Petroleum (East China), Qingdao (CN); Research Institute of Petroleum Exploration & Development, Beijing (CN)

(72) Inventors: Caili Dai, Qingdao (CN); Mingwei Zhao, Qingdao (CN); He Liu, Beijing (CN); Yining Wu, Qingdao (CN); YOngpeng Sun, Qingdao (CN); Guang Zhao, Qingdao (CN); Zhongliang Xu, Qingdao (CN)

(73) Assignees: China University of Petroleum (East China), Qingdao (CN); Research Institute of Petroleum Exploration & Development, Beijing (CN)

( * ) Notice: Subject to any disclaimer, the term of this patent is extended or adjusted under 35 U.S.C. 154(b) by 0 days.

(21) Appl. No.: 15/671,736

(22) Filed: Aug. 8, 2017

(30) Foreign Application Priority Data

Apr. 6, 2017 (CN) .......................... 2017 1 0222106

(51) Int. Cl.
*C09K 8/74* (2006.01)
*C08F 220/56* (2006.01)

(52) U.S. Cl.
CPC .............. *C09K 8/74* (2013.01); *C08F 220/56* (2013.01)

(58) Field of Classification Search
CPC ................................ C09K 8/74; C08F 220/56
(Continued)

(56) References Cited

U.S. PATENT DOCUMENTS

| 4,489,180 | A | * | 12/1984 | Lundberg | .................. | B63B 1/38 |
| | | | | | | 260/DIG. 31 |
| 4,666,964 | A | * | 5/1987 | Hunter | ..................... | C08J 3/124 |
| | | | | | | 524/106 |
| 2015/0345079 | A1 | * | 12/2015 | Engstrom | ............ | D21H 17/375 |
| | | | | | | 162/164.6 |

FOREIGN PATENT DOCUMENTS

| CN | 102453480 A | 5/2012 |
| CN | 102994070 A | 3/2013 |

(Continued)

OTHER PUBLICATIONS

Machine translation of Liu et al, CN 104231156, Dec. 2014.*
EIC search report, obtained in 2017.*

*Primary Examiner* — Frances Tischler
(74) *Attorney, Agent, or Firm* — Calfee, Halter & Griswold LLP

(57) ABSTRACT

The present invention relates to the field of oil-field chemical reagents, and discloses a polymer, a preparation method of the polymer, and a viscosified acid fluid. The polymer contains structural units represented by formula (1), structural units represented by formula (2), and structural units represented by formula (3), wherein, $R_1$-$R_6$ and $R_{11}$-$R_{13}$ are H or C1-C4 linear or branched alkyl respectively and independently, $R_7$ is C1-C4 linear or branched alkylene, $R_8$-$R_{10}$ are C1-C5 linear or branched alkyl respectively and independently, $R_{14}$ is C1-C4 linear or branched alkyl, and n=0-4.

formula (1)

formula (2)

(Continued)

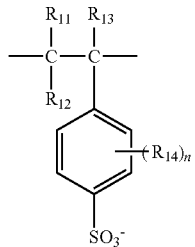

formula (3)

7 Claims, 1 Drawing Sheet

(58) Field of Classification Search
USPC .................................................. 507/222, 225
See application file for complete search history.

(56) References Cited

FOREIGN PATENT DOCUMENTS

CN         104231156    * 12/2014
CN         105907386 A    8/2016

* cited by examiner

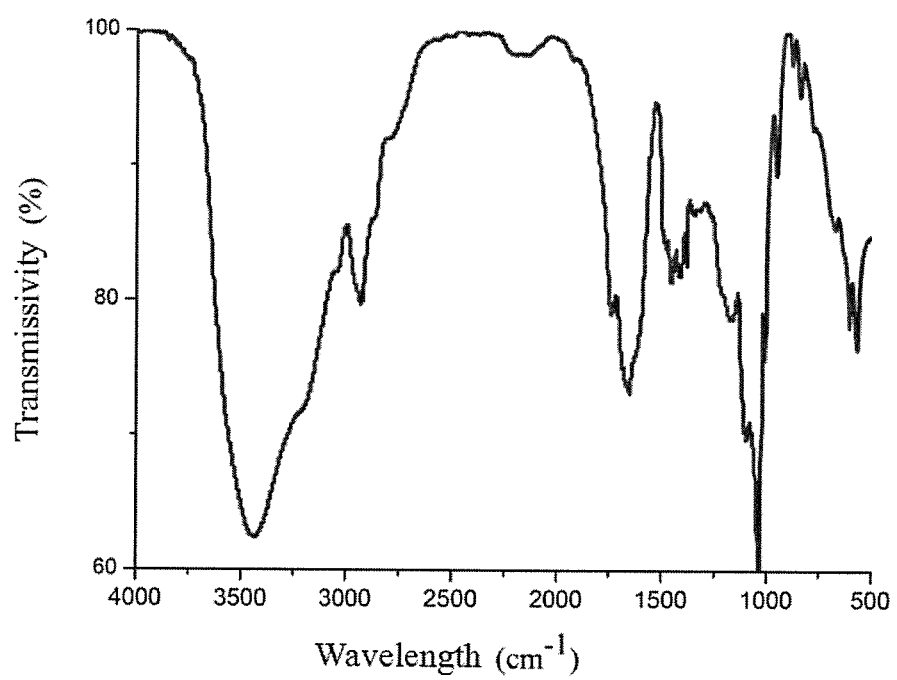

US 9,932,517 B1

POLYMER AND PREPARATION METHOD THEREOF, AND VISCOSIFIED ACID FLUID

CROSS REFERENCE TO RELATED APPLICATIONS

This application claims priority to Chinese Application No. 201710222106.X, filed on Apr. 6, 2017, entitled "A Polymer Acid Fluid Viscosifier", which is specifically and entirely incorporated by reference.

FIELD OF THE INVENTION

The present invention relates to the field of oil-field chemical reagents, in particular to a polymer, a preparation method of the polymer, and a viscosified acid fluid that contains the polymer.

BACKGROUND OF THE INVENTION

In recent years, a number of deep or ultra-deep carbonate oil and gas reservoirs have been developed in succession in China. Such oil and gas reservoirs usually can't provide seepage channels required for economical exploitation and most of them have no natural productivity owing to their poor physical properties and low porosity and permeability. Therefore, all of them require reservoir stimulation with acid fracturing and acidification measures, etc.

Conventional acid fluids have drawbacks such as low viscosity, small penetration depth, high filtration rate, and severe corrosion, etc.; therefore, often the acidification improvement can't attain the expected result. As a sort of retarded acid, viscous acids can attain a good effect for medium-permeability, high-permeability, or even low-permeability reservoirs that have fractures. By adding a high-performance viscosifier into an acid fluid, the viscosity of the acid fluid can be increased, the mass transfer velocity of hydrogen ions to rock wall surface can be decreased, and thereby the fluid loss of the acid fluid and the acid-rock reaction rate can be improved, the effective action distance of the acid fluid can be increased, and the reservoir stimulation effect can be improved remarkably. Developing a high-performance acid fluid viscosifier is a subject that has been explored continuously by oil production workers.

At present, common acid fluid viscosifiers mainly include natural polymer acid fluid viscosifiers, synthetic polymer acid fluid viscosifiers, and viscoelastic surfactant acid fluid viscosifiers, etc.

Natural polymer acid fluid viscosifiers, such as guanidine viscosifiers and their derivatives, cellulose viscosifiers and their derivatives, etc., have to be used in combination with several auxiliary agents, and have to be used under the conditions of low temperature and low shearing rate, because they are susceptible to degradation by fungi and biological enzymes. Therefore, they are seldom used nowadays, and are rarely seen among the product varieties developed lately.

As an example of viscoelastic surfactant acid fluid viscosifier, the polymer-free viscous acid for acid fracturing of carbonate oil reservoirs disclosed in the patent document CN102453480A consists of the following components (in weight percentage): hexadecyl trimethyl ammonium bromide: 5%-0.7%; 36-38% hydrochloric acid: 20-25%; Fe stabilizer: citric acid (0.2-0.25%), CX-301 (0.05-0.1%), or TW-1 (0.3-0.5%); quaternary ammonium bis-imidazoline: 0.22-0.25%; water: the remaining content. Though the surfactant acid fluid viscosifiers don't involve problems such as residue and solution time, they are expensive, and some of the components are toxic. Therefore, they are unsuitable for use widely.

The Chinese patent document CN105907386A has disclosed an emulsion viscous acid, which comprises an emulsion viscosifier, an inhibitor, a Fe stabilizer, a cleanup additive, hydrochloric acid, and water, wherein, the volumetric fraction of the emulsion viscosifier is 1%-5%, the volumetric fraction of the inhibitor is 0.5%-1.5%, the volumetric fraction of the Fe stabilizer is 10%-25%, the volumetric fraction of the cleanup additive is 0.5%-1.5%, the volumetric fraction of hydrochloric acid is 10%-25%, and water accounts for the remaining content. The emulsion viscosifier can save energy required for powder production, can be dissolved more easily in the acid fluid, and can improve the application effect. However, it can't meet the requirement of construction at remote sites, because of its high transportation cost.

The patent document CN102994070A has disclosed a preparation process of a polymeric acid viscosifier. The process comprises the following steps: (a) dissolving polyethylene, pyrrolidone, and a crosslinker in a solution, and loading the solution into a reactor in which an organic solvent and an initiator exist; (b) heating up to a specific temperature and holding at the temperature; (c) heating up further to 130° C., and holding at the temperature for 8 h for reaction, so as to prepare a polymer; (d) treating by precipitation, filtering and drying, to obtain a powder product. Though the products is convenient to transport and simple in process, but the reaction temperature in the preparation process is too high and adverse to large-scale industrial production; moreover, the introduction of the crosslinker may cause increased dissolution time of the product in the acid fluid, and has adverse impact on field use.

As the understanding on viscosifiers is deepened and the field application of viscous acid techniques is widened, the requirements for acid viscosifiers become higher and higher, mainly including high viscosifying ability of the viscosifier for acid fluids, high stability, and simple field application, etc.

SUMMARY OF THE INVENTION

The object of the present invention is to provide a polymer, a preparation method of the polymer, and a viscosified acid fluid, in order to overcome the above drawbacks of the acid viscosifiers in the prior art. The viscosified acid fluid that contains the polymer has outstanding high-temperature resistant and shear-resistant properties, and can meet the requirements of construction in deep wells at a high temperature.

In the first aspect, the present invention provides a polymer, which contains structural units represented by formula (1), structural units represented by formula (2), and structural units represented by formula (3),

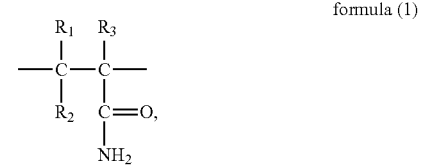

formula (1)

-continued

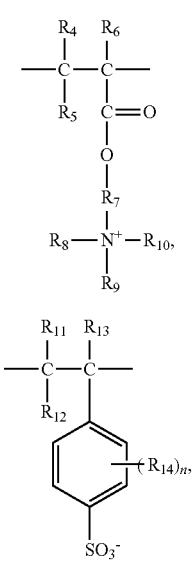

formula (2)

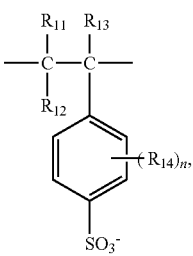

formula (3)

wherein, $R_1$-$R_6$ and $R_{11}$-$R_{13}$ are H or C1-C4 linear or branched alkyl respectively and independently, $R_7$ is C1-C4 linear or branched alkylene, $R_8$-$R_{10}$ are C1-C5 linear or branched alkyl respectively and independently, $R_{14}$ is C1-C4 linear or branched alkyl, and n=0-4.

In the second aspect, the present invention provides a method for preparing a polymer, comprising: a compound represented by formula (4), a compound represented by formula (5) and a compound represented by formula (6) are subjected to a polymerization reaction, in the presence of a solvent and an initiator,

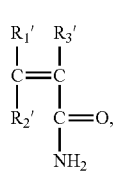

formula (4)

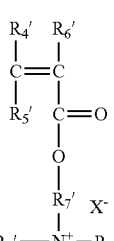

formula (5)

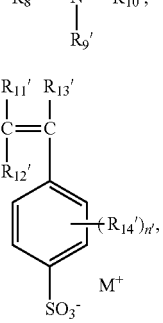

formula (6)

wherein, $R_{1'}$-$R_{6'}$ and $R_{11'}$-$R_{13'}$ are H or C1-C4 linear or branched alkyl respectively and independently, $R_{7'}$ is C1-C4 linear or branched alkylene, $R_{8'}$-$R_{10'}$ are C1-C5 linear or branched alkyl respectively and independently, $R_{14'}$ is C1-C4 linear or branched alkyl, n'=0-4, X is halogen, M is K or Na.

In the third aspect, the present invention provides a viscosified acid fluid, which comprises an acid and a viscosifier that is the polymer according to the present invention.

The polymer provided in the present invention has high temperature-resistant and shear-resistant properties when it is used as an acid viscosifier. Especially, when the polymer is used in 5-28 wt % hydrochloric acid, the apparent viscosity of the obtained viscosified acid fluid at room temperature (20-30° C.) and 7.34 $s^{-1}$ shearing rate is as high as 100 mPa·s or above; after the polymer is stabilized for 2 h at 90° C., the viscosity retentivity is still 60% or higher; the viscosity is still 30 mPa·s or above at 110° C. temperature and 170 $s^{-1}$ shearing rate. Therefore, the polymer provided in the present invention has high viscosifying, temperature-resistant and shear-resistant properties, and high thermostability. Moreover, compared with conventional preparation processes, the preparation method of the polymer provided in the present invention has advantages including high efficiency, simple process, mild conditions, easy control of polymerization process, and greatly reduced production cost, etc., and is easy to applied widely in the industry; the product has high dissolvability, is easy to transport, and has a good application prospect.

BRIEF DESCRIPTION OF THE DRAWINGS

FIG. 1 is an infrared spectrogram of the polymer prepared in preparation example 1 of the present invention.

DETAILED DESCRIPTION

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

In the first aspect, the present invention provides a polymer, which contains structural units represented by formula (1), structural units represented by formula (2), and structural units represented by formula (3),

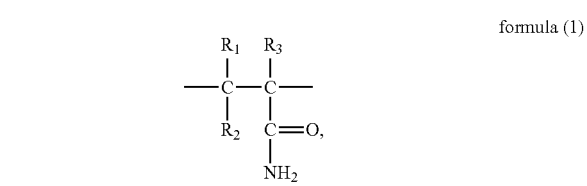

formula (1)

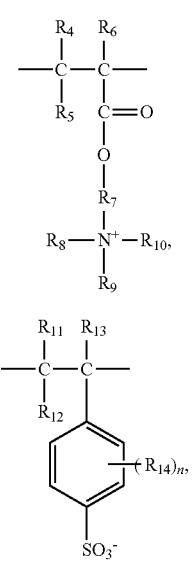

formula (2)

formula (3)

wherein, $R_1$-$R_6$ and $R_{11}$-$R_{13}$ are H or C1-C4 linear or branched alkyl (e.g., methyl, ethyl, n-propyl, isopropyl, n-butyl, sec-butyl, isobutyl, or tert-butyl) respectively and independently, $R_7$ is C1-C4 linear or branched alkylene (e.g., methylene, ethylidene, propylidene, 1-methyl ethylidene, butylidene, 1-methyl propylidene, 2-methyl propylidene, or 1,2-dimethyl ethylidene), $R_8$-$R_{10}$ are C1-C5 linear or branched alkyl (e.g., methyl, ethyl, n-propyl, isopropyl, n-butyl, sec-butyl, isobutyl, tert-butyl, n-pentyl, sec-pentyl, 1-ethyl propyl, 2-methyl butyl, tert-pentyl, 1,2-dimethyl propyl, isopentyl, or neo-pentyl) respectively and independently, $R_{14}$ is C1-C4 linear or branched alkyl (e.g., methyl, ethyl, n-propyl, isopropyl, n-butyl, sec-butyl, isobutyl, or tert-butyl), and n=0-4.

In the present invention, preferably, $R_1$-$R_6$ and $R_{11}$-$R_{13}$ are H or C1-C3 linear or branched alkyl respectively and independently, $R_7$ is C1-C3 linear or branched alkylene, $R_8$-$R_{10}$ are C1-C4 linear or branched alkyl respectively and independently, and $R_{14}$ is C1-C3 linear or branched alkyl.

According to a more preferred embodiment of the present invention, $R_1$-$R_6$ and $R_{11}$-$R_{13}$ are H, $R_7$ is ethylidene, $R_8$-$R_{10}$ is methyl, and n=0. In that preferred embodiment, the polymer has better temperature-resistant and shear-resistant properties.

In the present invention, the polymer may be a random copolymer or block copolymer, and in the polymer, the structural units represented by formula (1), the structural units represented by formula (2) and the structural units represented by formula (3) in the polymer preferably have a molar ratio of 12-18:1-4:1-4.

In the present invention, to further improve the temperature-resistant and shear-resistant properties of the polymer, preferably, the number-average molecular weight of the polymer is 3,000,000 to 7,000,000, further preferably is 3,500,000 to 6,000,000, and the molecular weight distribution index of the polymer is 1.2-2, further preferably is 1.2-1.5.

In the present invention, the number-average molecular weight and molecular weight distribution index of the polymer may be measured with conventional methods in the art. For example, both the number-average molecular weight and the molecular weight distribution index may be measured by gel permeation chromatography (GPC), with a Watersg1525 gel permeation chromatograph from Waters (a US company), utilizing THF as the solvent and polystyrene (PS) as a standard phase, at 30° C. test temperature.

In the second aspect, the present invention provides a method for preparing a polymer, comprising: a compound represented by formula (4), a compound represented by formula (5) and a compound represented by formula (6) are subjected to a polymerization reaction, in the presence of a solvent and an initiator,

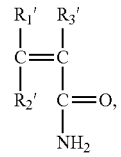

formula (4)

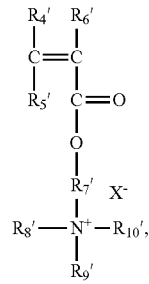

formula (5)

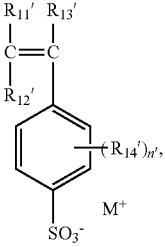

formula (6)

wherein, $R_1'$-$R_6'$ and $R_{11}'$-$R_{13}'$ are H or C1-C4 linear or branched alkyl (e.g., methyl, ethyl, n-propyl, isopropyl, n-butyl, sec-butyl, isobutyl, or tert-butyl) respectively and independently, $R_7'$ is C1-C4 linear or branched alkylene (e.g., methylene, ethylidene, propylidene, 1-methyl ethylidene, butylidene, 1-methyl propylidene, 2-methyl propylidene, or 1,2-dimethyl ethylidene), $R_8'$-$R_{10}'$ are C1-C5 linear or branched alkyl (e.g., methyl, ethyl, n-propyl, isopropyl, n-butyl, sec-butyl, isobutyl, tert-butyl, n-pentyl, sec-pentyl, 1-ethyl propyl, 2-methyl butyl, tert-pentyl, 1,2-dimethyl propyl, isopentyl, or neo-pentyl) respectively and independently, X is halogen (e.g., F, Cl, or Br), $R_{14'}$ is C1-C4 linear or branched alkyl (e.g., methyl, ethyl, n-propyl, isopropyl, n-butyl, sec-butyl, isobutyl, or tert-butyl), n'=0-4, and M is K or Na.

In the present invention, preferably, $R_1'$-$R_6'$ and $R_{11}'$-$R_{13}'$ are H or C1-C3 linear or branched alkyl respectively and independently, $R_7'$ is C1-C3 linear or branched alkylene, $R_8'$-$R_{10}'$ are C1-C4 linear or branched alkyl respectively and independently, and $R_{14'}$ is C1-C3 linear or branched alkyl.

According to a more preferred embodiment of the present invention, $R_1'$-$R_6'$ and $R_{11}'$-$R_{13}'$ are H, $R_7'$ is ethylidene, $R_8'$-$R_{10}'$ is methyl, and n'=0. In that preferred embodiment, the raw material is available easily, and the prepared polymer has better temperature-resistant and shear-resistant properties.

The polymer prepared with the method provided in the present invention may be a random polymer or block polymer, and the amount of the compound represented by formula (4), the compound represented by formula (5) and the compound represented by formula (6) are used such that structural units derived from the compound represented by formula (4), structural units derived from the compound represented by formula (5) and structural units derived from the compound represented by formula (6) in the polymer preferably have a molar ratio of 12-18:1-4:1-4.

In the present invention, to further improve the temperature-resistant and shear-resistant properties of the polymer, preferably, the polymerization reaction is executed under conditions that ensure the number-average molecular weight of the obtained polymer is 3,000,000 to 7,000,000, further preferably is 3,500,000 to 6,000,000, and the molecular weight distribution index of the polymer is 1.2-2, further preferably is 1.2-1.5. The measuring method for the number-average molecular weight and molecular weight distribution index of the polymer has been described above, and will not be further detailed here.

In the present invention, the initiator may be any chemical agent that enables the polymerization reaction to happen in the prior art. However, to improve the conversion efficiency of the raw materials, preferably, the initiator is $(NH_4)_2S_2O_8$ and/or $(NH_4)_2S_2O_8$—$NaHSO_3$. Wherein, $(NH_4)_2S_2O_8$—$NaHSO_3$ means that $(NH_4)_2S_2O_8$ and $NaHSO_3$ are used in combination and are added into the system in sequence. Preferably, $(NH_4)_2S_2O_8$ and $NaHSO_3$ have a molar ratio of 1:1.1-1.5.

In the present invention, preferably, the used amount of the initiator is 0.3-1 wt % of the total amount of the compound represented by formula (4), the compound represented by formula (5) and the compound represented by formula (6). Within that preferred range, the conversion efficiency of the raw materials is higher in the polymerization reaction.

In the present invention, the solvent may be a solvent that can dissolve the compound represented by formula (4), the compound represented by formula (5) and the compound represented by formula (6) at the same time. For example, the solvent may be water.

In the present invention, amount of the solvent may be used according to the amount of existing solvents in polymerization reactions; preferably, the amount of the solvent is 3-6 times of the total weight of the compound represented by formula (4), the compound represented by formula (5) and the compound represented by formula (6).

The method provided in the present invention may be applied under mild polymerization reaction conditions; for example, the conditions of the polymerization reaction include: temperature of 30-60° C., time of 3-8 h.

In the present invention, the raw materials of the reaction may be mixed with an existing mixing method commonly used for raw materials for polymerization reaction; for example, the preparation method comprises: dissolving the compound represented by formula (4), the compound represented by formula (5), and the compound represented by formula (6) in the solvent first, and then adding the initiator.

According to a preferred embodiment of the present invention, before the initiator is added, the pH of the solution is adjust to neutral, and the solution is heated up and held at a constant temperature. An existing pH adjustor may be used for adjusting the pH of the solution. For example, 1-5 wt % NaOH may be used for adjusting the pH.

In the present invention, the target temperature of the heating is the temperature of the polymerization reaction. Therefore, the target temperature of the heating is 30-60° C. The holding time at the temperature preferably is 20-40 min.

The polymerization reaction in the present invention preferably is executed under nitrogen or inert gas shielding. After the polymerization reaction is completed, the solution is treated by precipitation and filtering, and then the precipitate is washed and dried.

In the present invention, the washing solution used for the washing preferably is a mixed solution prepared from ethanol and water at a volumetric mix ratio of 4-9:1.

In the third aspect, the present invention provides a viscosified acid fluid, which comprises an acid and a viscosifier that is the polymer according to the present invention.

In the present invention, the acid in the viscosified acid fluid may be an existing inorganic acid and/or organic acid. For example, the inorganic acid may be at least one of HCl, $H_2SO_4$ and HF, the organic acid may be at least one of formic acid, acetic acid, lactic acid and citric acid. Especially, in the case that the acid is HCl, the viscosified acid fluid that contains the viscosifier has more outstanding temperature-resistant and shear-resistant properties, and the viscosified acid fluid may be applied in exploitation of carbonate oil and gas reservoirs.

In the present invention, to further improve the temperature-resistant and shear-resistant properties of the viscosified acid fluid, preferably, the content of the viscosifier in the acid fluid is 1-3 wt %, and the content of the acid in the viscosified acid fluid is 5-28 wt %.

Hereunder the present invention will be detailed in embodiments. In the following embodiments:

The infrared spectrogram is measured with a Nicolet 6700 FTIR analyzer (from Nicolet (a US company), designation: 6700);

Both the number-average molecular weight and molecular weight distribution index are measured by gel permeation chromatography (GPC) with a Watersg1525 gel permeation chromatograph from Waters (a US company), utilizing THF as the solvent and polystyrene (PS) as a standard phase, at 30° C. test temperature;

The contents of structural units in the polymer are measured with a S/N microanalyser (from Analytik Jena AG, designation: Multi EA3100);

Acrylamide is from Aladdin Reagent Co., ltd. with designation A108467;

Sodium styrene sulfonate is from Beijing J&K Chemical Technology Co., Ltd., with designation SY015111.

Acryloyloxyethyl trimethyl ammonium chloride is from Beijing J&K Chemical Technology Co., Ltd, with designation 555291;

Methacrylamide is from Aladdin Reagent Co., Ltd., with designation M104042;

Methacryloyloxy propyl trimethyl ammonium chloride is from Suzhou Weidu Chemical Co., Ltd., with designation 257-182-1;

$(NH_4)_2S_2O_8$ is from Sinopharm Group Co., Ltd., with designation 10002616;

$NaHSO_3$ is from Sinopharm Group Co., Ltd., with designation 10019018.

Preparation Example 1

30 g monomeric raw materials are added into 100 g distilled water, and are stirred and dissolved, wherein, in the monomeric raw materials, the content of acrylamide (all of $R_1$-$R_3$ in formula (4) are H) is 80% of the total molar mass of the monomers, the content of sodium styrene sulfonate ($R_{11'}$-$R_{13'}$ in formula (6) are H, n'=0, M is Na) is 10% of the total molar mass of the monomers, and the content of acryloyloxyethyl trimethyl ammonium chloride ($R_{4'}$-$R_{6'}$ in formula (5) are H, $R_{7'}$ is ethylidene, $R_{8'}$-$R_{10'}$ are methyl) is 10% of the total molar mass of the monomers. The reaction liquid obtained after dissolution is added into a three-mouth round flask, nitrogen is charged into the flash, the bubbles are adjusted to a uniform and consecutive state, the pH of the reaction liquid is adjusted to neutral with 5 wt % NaOH solution, and then the reaction liquid is heated up to 45° C. and held at the temperature for 30 min.; then, 0.09 g initiator $(NH_4)_2S_2O_8$—$NaHSO_3$ ($(NH_4)_2S_2O_8$ and $NaHSO_3$ have a molar ratio of 1:1) is added into the system, nitrogen is charged further, and the reaction is sustained for 4 h. After the reaction is completed, the product is precipitated and filtered, the precipitate is washed with a mixed solution of ethanol and water (at 5:1 volume ratio), and then treated by vacuum drying at 60° C., the dry product is crushed and pelleted (in 500 μm particle diameter); thus, a polymer A1 is obtained, and the yield ratio is 92%.

The infrared spectrogram of the polymer A1 is shown in FIG. 1, wherein, the strong peak at 3434 $cm^{-1}$ is caused by stretching vibration of the N—H bond in amido, and the moderate peak at 1685 $cm^{-1}$ is the characteristic peak of carbonyl in amido, and proves the existence of acrylamide in the polymer. The peaks at 2930 $cm^{-1}$ and 2871 $cm^{-1}$ are characteristic peaks of methyl, and prove the existence of acryloyloxyethyl trimethyl ammonium chloride in the polymer; the peaks at 1036 $cm^{-1}$ and 1170 $cm^{-1}$ are characteristic peaks of sulfonate (—$SO_3^-$), the peaks at 1493 $cm^{-1}$ and 1454 $cm^{-1}$ are characteristic peaks of benzene ring, and prove the existence of sodium p-styrene sulfonate.

According to the measurement result, in the polymer A1, the structural units represented by formula (1) ($R_1$-$R_3$ are H), the structural units represented by formula (2) ($R_4$-$R_6$ are H, $R_7$ is ethylidene, $R_8$-$R_{10}$ are methyl) and the structural units represented by formula (3) ($R_{11}$-$R_{13}$ are H, n=0) have a molar ratio of 17:3:2, the number-average molecular weight is 4,500,000, and the molecular weight distribution index is 1.5.

Preparation Example 2

30 g monomeric raw materials are added into 100 g distilled water, and are stirred and dissolved, wherein, in the monomeric raw materials, the content of acrylamide (all of $R_1$-$R_3$ in formula (4) are H) is 70% of the total molar mass of the monomers, the content of sodium styrene sulfonate ($R_{11'}$-$R_{13'}$ in formula (6) are H, n'=0, M is Na) is 15% of the total molar mass of the monomers, and the content of acryloyloxyethyl trimethyl ammonium chloride ($R_{4'}$-$R_{6'}$ in formula (5) are H, $R_{7'}$ is ethylidene, $R_{8'}$-$R_{10'}$ are methyl) is 15% of the total molar mass of the monomers. The reaction liquid obtained after dissolution is added into a three-mouth round flask, nitrogen is charged into the flask, the bubbles are adjusted to a uniform and consecutive state, the pH of the reaction liquid is adjusted to neutral with 5 wt % NaOH solution, and then the reaction liquid is heated up to 60° C. and held at the temperature for 30 min.; then, 0.15 g initiator $(NH_4)_2S_2O_8$—$NaHSO_3$ ($(NH_4)_2S_2O_8$ and $NaHSO_3$ have a molar ratio of 1:1) is added into the system, nitrogen is charged further, and the reaction is sustained for 8 h. After the reaction is completed, the product is precipitated and filtered, the precipitate is washed with a mixed solution of ethanol and water (at 5:1 volume ratio), and then treated by vacuum drying at 60° C., the dry product is crushed and pelleted (in 400 μm particle diameter); thus, a polymer A2 is obtained, and the yield ratio is 90%. In the polymer A2, the structural units represented by formula (1) ($R_1$-$R_3$ are H), the structural units represented by formula (2) ($R_4$-$R_5$ are H, $R_7$ is ethylidene, $R_8$-$R_{10}$ are methyl) and the structural units represented by formula (3) ($R_{11}$-$R_{13}$ are H, n=0) have a molar ratio of is 15:4:3, the number-average molecular weight is 3,500,000, and the molecular weight distribution index is 1.35.

Preparation Example 3

30 g monomeric raw materials are added into 100 g distilled water, and are stirred and dissolved, wherein, in the monomeric raw materials, the content of acrylamide (all of $R_1$-$R_3$ in formula (4) are H) is 75% of the total molar mass of the monomers, the content of sodium styrene sulfonate ($R_{11'}$-$R_{13'}$ in formula (6) are H, n'=0, M is Na) is 15% of the total molar mass of the monomers, and the content of acryloyloxyethyl trimethyl ammonium chloride ($R_{4'}$-$R_{6'}$ in formula (5) are H, $R_{7'}$ is ethylidene, $R_{8'}$-$R_{10'}$ are methyl) is 10% of the total molar mass of the monomers. The reaction liquid obtained after dissolution is added into a three-mouth round flask, nitrogen is charged into the flash, the bubbles are adjusted to a uniform and consecutive state, the pH of the reaction liquid is adjusted to neutral with 5 wt % NaOH solution, and then the reaction liquid is heated up to 40° C. and held at the temperature for 30 min.; then, 0.21 g initiator $(NH_4)_2S_2O_8$—$NaHSO_3$ ($(NH_4)_2S_2O_8$ and $NaHSO_3$ have a molar ratio of 1:1) is added into the system, nitrogen is charged further, and the reaction is sustained for 8 h. After the reaction is completed, the product is precipitated and filtered, the precipitate is washed with a mixed solution of ethanol and water (at 5:1 volume ratio), and then treated by vacuum drying at 60° C., the dry product is crushed and pelleted (in 500 μm particle diameter); thus, a polymer A3 is obtained, and the yield ratio is 91%. In the polymer A3, the structural units represented by formula (1) ($R_1$-$R_3$ are H), the structural units represented by formula (2) ($R_4$-$R_6$ are H, $R_7$ is ethylidene, $R_8$-$R_{10}$ are methyl) and the structural units represented by formula (3) ($R_{11}$-$R_{13}$ are H, n=0) have a molar ratio of 6:2:2, the number-average molecular weight is 3,900,000 and the molecular weight distribution index is 1.52.

Preparation Example 4

25 g monomeric raw materials are added into 100 g distilled water, and are stirred and dissolved, wherein, in the monomeric raw materials, the content of acrylamide (all of $R_1$-$R_3$ in formula (4) are H) is 90% of the total molar mass of the monomers, the content of sodium styrene sulfonate ($R_{11'}$-$R_{13'}$ in formula (6) are H, n'=0, M is Na) is 5% of the total molar mass of the monomers, and the content of acryloyloxyethyl trimethyl ammonium chloride ($R_{4'}$-$R_{6'}$ in formula (5) are H, $R_{7'}$ is ethylidene, $R_{8'}$-$R_{10'}$ are methyl) is 5% of the total molar mass of the monomers. The reaction liquid obtained after dissolution is added into a three-mouth round flask, nitrogen is charged into the flash, the bubbles are adjusted to a uniform and consecutive state, the pH of the reaction liquid is adjusted to neutral with 5 wt % NaOH solution, and then the reaction liquid is heated up to 50° C. and held at the temperature for 30 min.; then, 0.175 g initiator $(NH_4)_2S_2O_8$—$NaHSO_3$ is added into the system, nitrogen is charged further, and the reaction is sustained for 5 h. After the reaction is completed, the product is precipitated and filtered, the precipitate is washed with a mixed solution of ethanol and water (at 5:1 volume ratio), and then treated by vacuum drying at 60° C., the dry product is crushed and pelleted (in 500 μm particle diameter); thus, a polymer A4 is obtained, and the yield ratio is 90%. In the polymer A4, the structural units represented by formula (1) ($R_1$-$R_3$ are H), the structural units represented by formula (2) ($R_4$-$R_6$ are H, $R_7$ is ethylidene, $R_8$-$R_{10}$ are methyl) and the structural units represented by formula (3) ($R_{11}$-$R_{13}$ are H, n=0) have a molar ratio of 92:5:3, the number-average molecular weight is 5,200,000, and the molecular weight distribution index is 1.75.

Preparation Example 5

A polymer is prepared with the method described in the preparation example 1, but in the monomeric raw materials, the content of methacrylamide ($R_{1'}$ and $R_{2'}$ in formula (4) are H, $R_{3'}$ is methyl) is 80% of the total molar mass of the monomers, the content of sodium styrene sulfonate (the structural formula is represented by formula (6), in which $R_{11'}$-$R_{13'}$ are H, n'=0, M is Na) is 10% of the total molar mass of the monomers, and the content of methacryloyloxy propyl trimethyl ammonium chloride ($R_{4'}$-$R_{5'}$ in formula (5) are H, $R_{6'}$ is methyl, $R_{7'}$ is propylidene, $R_{8'}$-$R_{10'}$ are methyl) is 10% of the total molar mass of the monomers. Thus, a polymer A5 is obtained, and the yield ratio is 90%. In the polymer A5, the structural units represented by formula (1) ($R_1$ and $R_2$ are H, $R_3$ is methyl), the structural units represented by formula (2) ($R_4$-$R_5$ are H, R6 is methyl, $R_7$ is propylidene, $R_8$-$R_{10}$ are methyl) and the structural units represented by formula (3) ($R_{11}$-$R_{13}$ are H, n=0) have a molar ratio of 18:3:3, the number-average molecular weight is 4,200,000, and the molecular weight distribution index is 1.55.

Preparation Example 6

A polymer is prepared with the method described in the preparation example 1, but the conditions of the polymerization reaction are: temperature of 75° C., time of 5 h. Thus, a polymer A6 is obtained (the number-average molecular weight is 2,800,000, the molecular weight distribution index is 1.48), and the yield ratio is 93%.

Comparative Preparation Example 1

A polymer is prepared with the method described in the preparation example 1, but the monomeric raw materials consist of 80% (molar mass) acrylamide and 20% (molar mass) sodium styrene sulfonate. Thus, a polymer D1 is obtained.

Comparative Preparation Example 2

A polymer is prepared with the method described in the preparation example 1, but the monomeric raw materials consist of 80% (molar mass) acrylamide and 20% (molar mass) acryloyloxyethyl trimethyl ammonium chloride. Thus, a polymer D2 is obtained.

Comparative Preparation Example 3

A polymer is prepared with the method described in the preparation example 1, but the monomeric raw materials consist of 50% (molar mass) sodium styrene sulfonate and 50% (molar mass) acryloyloxyethyl trimethyl ammonium chloride. Thus, a polymer D3 is obtained.

Example 1

3 g polymer A1 prepared in the preparation example 1 is weighed and added into 100 g 20 wt % hydrochloric acid solution and stirred and dissolved; thus, a viscosified acid fluid S1 is obtained.

Example 2

2 g polymer A2 prepared in the preparation example 2 is weighed and added into 100 g 20 wt % hydrochloric acid solution and stirred and dissolved; thus, a viscosified acid fluid S2 is obtained.

Example 3

2 g polymer A3 prepared in the preparation example 3 is weighed and added into 100 g 20 wt % hydrochloric acid solution and stirred and dissolved; thus, a viscosified acid fluid S3 is obtained.

Examples 4-5

Viscosified acid fluids are prepared with the method described in the example 3, but the polymer A3 is replaced with the polymer A4 and polymer A5 in the same weight respectively; thus, viscosified acid fluids S4 and S5 are obtained.

Example 6

A viscosified acid fluid is prepared with the method as described in the example 3, but the dose of the polymer A3 is 0.5 g. Thus, a viscosified acid fluid S6 is obtained.

Example 7

A viscosified acid fluid is prepared with the method described in the example 3, but the polymer A3 is replaced with the polymer A6 in the same weight; thus, a viscosified acid fluid S7 are obtained.

Comparative Examples 1-3

Viscosified acid fluids are prepared with the method described in the example 3, but the polymer A3 is replaced with the polymers D1, D2 and D3 respectively; thus, viscosified acid fluids DS1, DS2 and DS3 are obtained.

Measurements (1) Initial Apparent Viscosity: The viscosity values of the viscosified acid fluids S1-S6 and DS1-DS3 at 25° C. and 7.34 $s^{-1}$ shearing rate are measured with a rotational viscometer (from BROOKFIELD (a US company), with designation DV2T), and are taken as initial apparent viscosity values, respectively. The results are shown in Table 1.

(2) Temperature-resistant and Shear-resistant Properties: The viscosity values of the viscosified acid fluids S1-S6 and DS1-DS6 sheared at 110° C. and 170 $s^{-1}$ shearing rate for 10 min. are measured with a rheometer (from Thermo Fisher SCIENTIFIC, with designation Haake MARS 60, the same below). The results are shown in Table 1.

(3) Thermostability: The viscosified acid fluids S1-S6 and DS1-DS3 are held at 90° C. for 2.5 h, and then the apparent viscosity values of the viscosified acid fluids are measured with a rheometer (sheared at 7.34 $s^{-1}$ shearing rate for 10 min.). The results are shown in Table 1.

TABLE 1

| | Initial apparent viscosity/ mPa·s | Viscosity after shearing at 110° C. and 170 s⁻¹ shearing rate for 10 min./mPa·s | After holding at 90° C. for 2.5 h | |
|---|---|---|---|---|
| | | | Appearance | Apparent viscosity/ mPa·s |
| S1 | 136 | 33 | Clear and transparent | 87 |
| S2 | 143 | 36 | Clear and transparent | 98 |
| S3 | 178 | 45 | Clear and transparent | 125 |
| S4 | 148 | 35 | Clear and transparent | 90 |
| S5 | 154 | 37 | Clear and transparent | 93 |
| S6 | 126 | 33 | Clear and transparent | 80 |
| S7 | 121 | 32 | Clear and transparent | 78 |
| DS1 | — | — | Stratified, with precipitate | — |
| DS2 | 110 | — | Stratified, with precipitate | — |
| DS3 | 55 | 11 | Clear and transparent | 16 |

It can be seen from Table 1: the apparent viscosity of a viscosified acid fluid that contains the polymer provided in the present invention is up to 100 mPa·s or above at room temperature, which indicates that the polymer provided in the present invention has an outstanding acid viscosifying effect; the viscosity of a viscosified acid fluid that contains the polymer provided in the present invention is still 30 mPa·s or above after it is sheared at 110° C. and 170 s⁻¹ shearing rate for 10 min, which indicates that the polymer provided in the present invention has high temperature-resistant and shear-resistant properties. A viscosified acid fluid that contains the polymer provided in the present invention remains clear and transparent and the viscosity retentivity is still 60% or high after the viscosified acid fluid is held at 90° C. for 2.5 h, which indicates that the polymer provided in the present invention has good dissolvability and thermostability.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A polymer consisting of structural units represented by formula (1), structural units represented by formula (2), and structural units represented by formula (3),

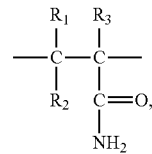

formula (1)

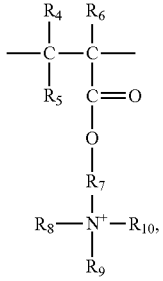

formula (2)

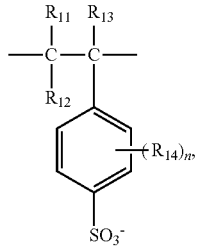

formula (3)

wherein, $R_1$-$R_6$ and $R_{11}$-$R_{13}$ are independently H or C1-C4 linear or branched alkyl, $R_7$ is C1-C4 linear or branched alkylene, $R_8$-$R_{10}$ are independently C1-C5 linear or branched alkyl, $R_{14}$ is C1-C4 linear or branched alkyl, and n=0-4; wherein a molar ratio of the structural units represented by formula (1), the structural units represented by formula (2) and the structural units represented by formula (3) in the polymer is 12-18:1-4:1-4.

2. The polymer according to claim 1, wherein $R_1$-$R_6$ and $R_{11}$-$R_{13}$ are H, $R_7$ is ethylidene, $R_8$-$R_{10}$ are methyl, and n=0.

3. The polymer according to claim 1, wherein the number-average molecular weight of the polymer is 3,000,000 to 7,000,000, and molecular weight distribution index of the polymer is 1.2-2.

4. A viscosified acid fluid comprising an acid and a viscosifier that is the polymer according to the claim 1.

5. The viscosified acid fluid according to claim 4, wherein $R_1$-$R_6$ and $R_{11}$-$R_{13}$ are H, $R_7$ is ethylidene, $R_8$-$R_{10}$ are methyl, and n=0.

6. The viscosified acid fluid according to claim 4, wherein the number-average molecular weight of the polymer is 3,000,000 to 7,000,000, and molecular weight distribution index of the polymer is 1.2-2.

7. The viscosified acid fluid according to claim 4, wherein the content of the viscosifier in the viscosified acid fluid is 1-3 wt %, and the content of the acid in the viscosified acid fluid is 5-28 wt %.

* * * * *

UNITED STATES PATENT AND TRADEMARK OFFICE
CERTIFICATE OF CORRECTION

PATENT NO. : 9,932,517 B1
APPLICATION NO. : 15/671736
DATED : April 3, 2018
INVENTOR(S) : Dai et al.

Page 1 of 1

It is certified that error appears in the above-identified patent and that said Letters Patent is hereby corrected as shown below:

On the Title Page

Item (72):
"YOngpeng Sun"
Should read:
"Yongpeng Sun"

Signed and Sealed this
Twelfth Day of June, 2018

Andrei Iancu
*Director of the United States Patent and Trademark Office*